United States Patent [19]

Clarke et al.

[11] Patent Number: 4,479,884

[45] Date of Patent: Oct. 30, 1984

[54] DETERGENT BAR PROCESSING

[75] Inventors: Terence A. Clarke; Richard B. Edwards; Graeme N. Irving, all of Wirral, England

[73] Assignee: Lever Brothers Company, New York, N.Y.

[21] Appl. No.: 587,875

[22] Filed: Mar. 14, 1984

Related U.S. Application Data

[63] Continuation of Ser. No. 479,627, Mar. 28, 1983, abandoned.

[30] Foreign Application Priority Data

Mar. 29, 1982 [GB] United Kingdom ................. 8209149

[51] Int. Cl.[3] .......................... B01F 7/02; B29B 1/06; C11D 9/48; C11D 13/10

[52] U.S. Cl. .................................... 252/132; 252/108; 252/134; 252/368; 252/370; 252/371; 252/DIG. 16; 264/176 R; 264/310; 264/312; 264/349; 366/99; 366/279; 366/307; 425/200; 425/204; 425/207; 425/209

[58] Field of Search ..................... 252/108, 132, 134, , 252/368, 370, 371, DIG. 16; 264/176 R, 310, 312; 366/99, 279, 307; 425/200, 204, 206, 209, 207

[56] References Cited

U.S. PATENT DOCUMENTS

| | | | |
|---|---|---|---|
| 2,640,033 | 5/1953 | Marshall | 252/367 |
| 2,686,761 | 8/1954 | Ferguson | 252/109 |
| 2,970,116 | 1/1961 | Kelly | 252/368 |
| 3,089,197 | 5/1963 | Chaffee | 425/207 |
| 3,174,185 | 3/1965 | Gerber | 366/99 |
| 3,523,909 | 8/1970 | Bradley | 252/370 |
| 4,253,771 | 3/1981 | Renk | 366/89 |
| 4,419,014 | 12/1983 | Gale | 366/99 |

FOREIGN PATENT DOCUMENTS

| | | |
|---|---|---|
| 1090183 | 10/1960 | Fed. Rep. of Germany . |
| 2050222 | 5/1971 | Fed. Rep. of Germany . |
| 2151891 | 4/1973 | Fed. Rep. of Germany . |
| 723361 | 2/1955 | United Kingdom . |
| 727646 | 4/1955 | United Kingdom . |
| 787764 | 12/1957 | United Kingdom . |
| 841743 | 7/1960 | United Kingdom . |
| 930339 | 7/1963 | United Kingdom . |
| 1281628 | 7/1972 | United Kingdom . |
| 1447435 | 8/1976 | United Kingdom . |
| 1475216 | 6/1977 | United Kingdom . |
| 2034742 | 6/1980 | United Kingdom . |
| 2106407 | 4/1983 | United Kingdom . |

OTHER PUBLICATIONS

Elastomerics, Oct. 1981, p. 76/8.

Press Release by "The International Technical Centre for Rubbers and Plastics" dated Jan. 6, 1982, an Addendum to such Press Release Indicating the Parties to Whom such Press Release was Dispatched Upon a Worldwide Basis.

Plastics & Rubber Weekly, No. 919, Jan. 9, 1981, p. 1.

Applications of the Cavity Transfer Mixer to Rubber Extrusion, Presentation at a Meeting of the Rubber Div., Amer. Chemical Soc., Philadelphia, May 4–8, 1982 by R. S. Hindmarch & G. M. Gale.

Press Release by "The International Technical Centre for Rubbers and Plastics" dated Aug. 3, 1981, Addendum to such Press Release Showing the Persons to Whom such Press Release was Dispatched Upon a Worldwide Basis.

*Primary Examiner*—Dennis L. Albrecht
*Attorney, Agent, or Firm*—James J. Farrell

[57] ABSTRACT

The mush and/or lather properties of soap-containing material including free fatty acids can be improved by subjecting the material to working. The material is passed through the shear zone(s) formed between two mutually displaceable surfaces between which the material passes.

5 Claims, 8 Drawing Figures

DETERGENT BAR PROCESSINGThis is a continuation application Ser. No. 479,627 filed Mar. 28, 1983 now abandoned.

FIELD OF THE INVENTION

This invention relates to the processing of soap feedstocks to provide a superfatted soap bar having improved properties.

BACKGROUND TO THE INVENTION

Soap bars can be prepared from a variety of long chain fatty acids derived from vegetable, animal and synthetic feedstocks. Examples of these feedstocks are tallow and coconut oil. It has been known for many years that the presence of a small proportion of free fatty acid in a soap bar can provide desirable consumer properties, for example creamy lather. The proportion of free acid will normally be in the range from 1% to 15% by weight of the bar and preferably in the 5% to 10% range. Usually, but not exclusively, the free acid will be derived from the shorter chain length feedstocks such as coconut oil.

A level of free fatty acid above 5% is usually required to obtain the benefit when the moisture level is about 8% to about 12%. With amounts of tallow above 70% in tallow/coconut charge the free fatty acid is preferably present at a level about 7.5%, more preferably above 10%.

GENERAL DESCRIPTION

The present invention describes a method of improving the lather volume and/or mush of a soap bar containing free fatty acid by subjecting the soap feedstock to considerable working within a specific temperature range in an efficient manner. The temperature is sensitive to the composition and is preferably below 40° C.

The present invention uses a device of the cavity transfer mixer class to work the soap base. These devices comprise two closely spaced mutually displaceable surfaces each having a pattern of cavities which overlap during movement of surfaces so that material moved between the surfaces traces a path through cavities alternaately in each surface so that the bulk of the material passes through the shear zone in the material generated by displacement of the surfaces.

Cavity transfer mixers are normally prepared with a cylindrical geometry and in the preferred devices for this process the cavities are arranged to give constantly available but changing path ways through the device during mutual movement of the two surfaces. The devices having a cylindrical geometry will comprise a stator within which is journalled a rotor; the opposing faces of the stator and rotor carry the cavities through which the material passes during its passage through the device.

The device may also have a planar geometry in which opposed plane surfaces having patterns of cavities would be moved mutually, for example by rotation of one plane, so that material introduced between the surfaces at the point of rotation would move outwards and travel alternately between cavities on each surface.

Another form of cylindrical geometry maintains the inner cylinder stationary while rotating the outer cylinder. The central stator is more easily cooled, or heated if required, because the fluid connections can be made in a simple manner; the external rotor can also be cooled or heated in a simple manner. It is also mechanically simpler to apply rotational energy to the external body rather than the internal cylinder. Thus this configuration has advantages in construction and use.

Material is forced through the mixer using auxilliary equipment as the rotor is turned. Examples of the auxilliary equipment are screw extruders and piston rams. The auxiliary equipment is preferably operated separately from the mixer so that the throughput and work performed on it can be separately varied. The separate operation may be achieved by arranging the auxiliary equipment to provide material for processing at an angle to the centre line of the shear-producing device. This arrangement allows rotational energy to be supplied to the device producing shear around its centre line. An in-line arrangement is more easily achieved when the external member of the device is the rotor. Separate operation of the device and auxiliary equipment assists in providing control of the processing.

In general a variety of cavity shapes can be used, for example Metal Box (UK 930 339) disclose longitudinal slots in the two surfaces. The stator and rotor may carry slots, for example six to twelve, spaced around their periphery and extending along their whole length.

Preferably one or both surfaces are subjected to thermal control. The process allows efficient heating/cooling of the material to be achieved.

The soap feedstock may contain non-soap detergents in amounts which would not interfere with the desired effect. Examples of these actives are alkane sulphonates, alcohol sulphates, alkyl benzene sulphonates, alkyl sulphates, acyl isethionates, olefin sulphonates and ethoxylated alcohols.

The processed feedstock was made into bar form using standard stamping machinery. Other product forms, eg extruded particles (noodles) and beads can be prepared from the feedstock.

BRIEF DESCRIPTION OF THE DRAWINGS

The invention will be described with reference to the accompanying diagrammatic drawings in which.

SPECIFIC DESCRIPTION OF DEVICES

Embodiments of the devices will now be described.

Figure 1:
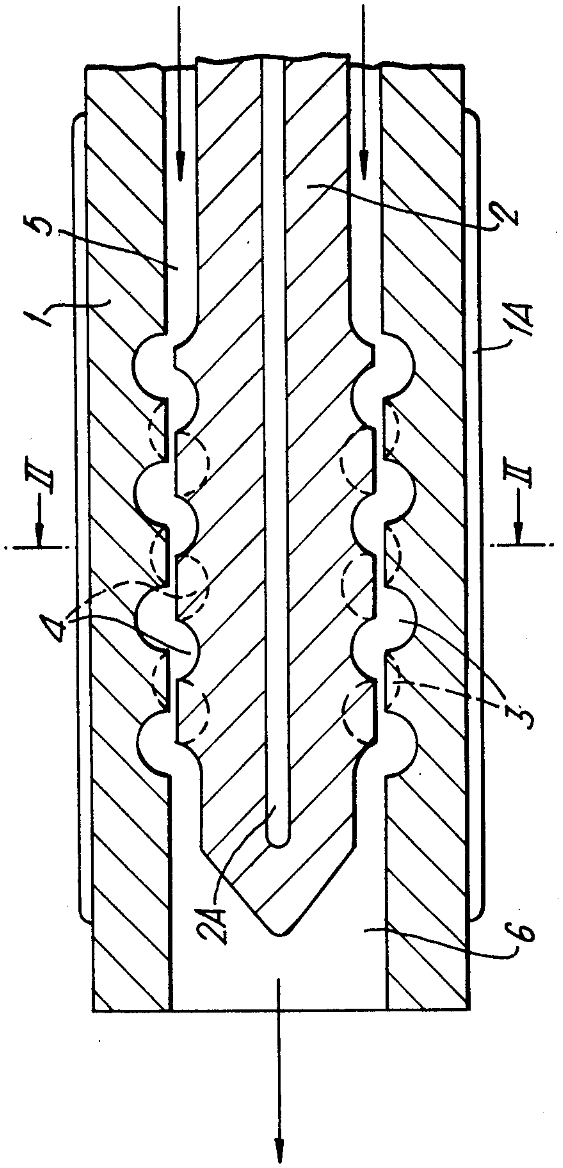
FIG. 1 is a longitudinal section of a cavity transfer mixer with cylindrical geometry.

A cavity transfer mixer is shown in FIG. 1 in longitudinal section. This comprises a hollow cylindrical stator member 1, a cylindrical rotor member 2 journalled for rotation within the stator with a sliding fit, the facing cylindrical surfaces of the rotor and stator carrying respective pluralities of parallel, circumferentially extending rows of cavities which are disposed with:

(a) the cavities in adjacent rows on the stator circumferentially offset;

(b) the cavities in adjacent rows on the rotor circumferentially offset; and (c) the rows of cavities on the stator and rotor axially offset.

Figure 2:
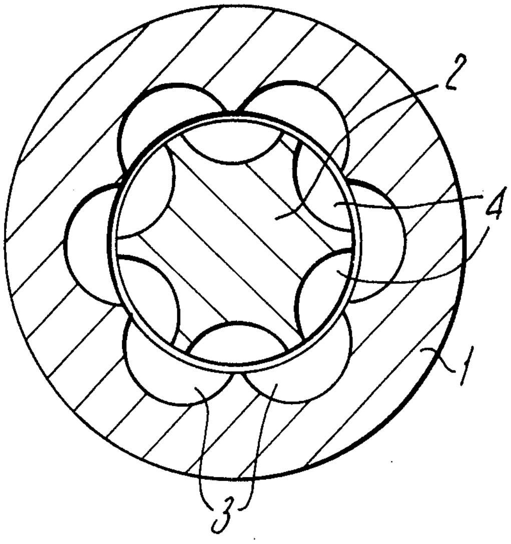
FIG. 2 is a transverse section along the line II—II on FIG. 1.
Figure 3:
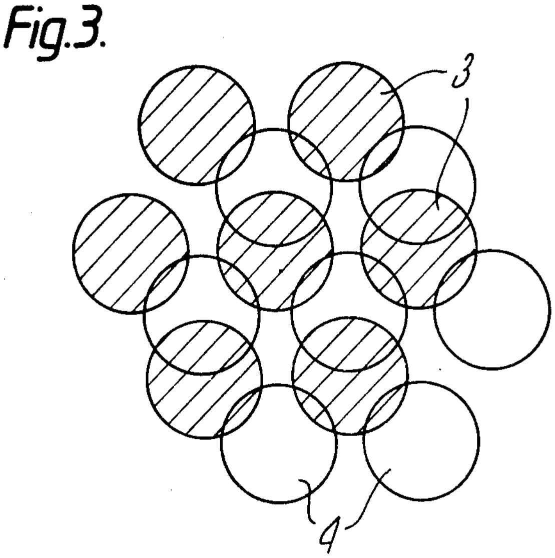
FIG. 3 illustrates the pattern of cavities in the device of FIG. 1.

The pattern of cavities carried on the stator 3 and rotor 4 are illustrated on FIG. 3. The cavities 3 on the stator are shown hatched. The overlap between patterns of cavities 3, 4 is also shown in FIG. 2. A liquid jacket 1A is provided for the application of temperature control by the passage of heating or cooling water. A temperature control conduit 2A is provided in the rotor.

The material passing through the device moves through the cavities alternately on the opposing faces of the stator and rotor. The cavities immediately behind those shown in section are indicated by dotted profiles on FIG. 1 to allow the repeating pattern to be seen.

The material flow is divided between pairs of adjacent cavities on the same rotor or stator face because of the overlapping position of the cavity on the opposite stator or rotor face.

The whole or bulk of the material flow is subjected to considerable working during its passage through the shear zone generated by the mutual displacement of the stator and rotor surfaces. The material is entrained for a short period in each cavity during passage and thus one of its velocity components is altered.

The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit. The material to be worked was injected into the device through channel 5, which communicates with the annular space between the rotor and stator, during operation by a screw extruder. The material left the device through nozzle 6.

Figure 4:
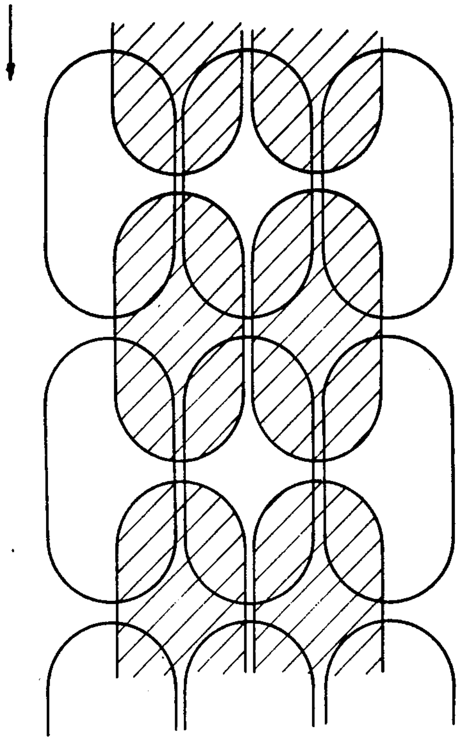
FIGS. 4, 5 and 7 illustrate other patterns of cavities.

FIG. 4 shows elongate cavities arranged in a square pattern; these cavities have the sectional profile of FIG. 2. These cavities are aligned with their longitudinal axis parallel to the longitudinal axis of the device and the direction of movement of material through the device; the latter is indicated by the arrow.

Figure 5:
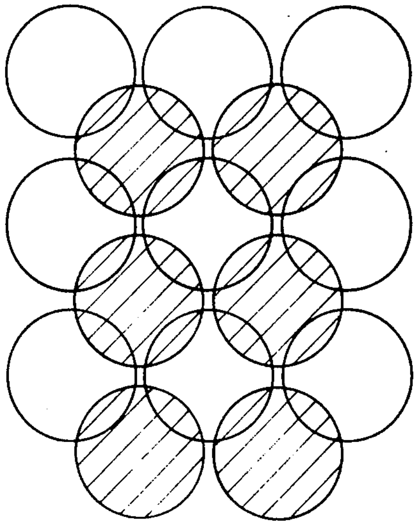

FIG. 5 shows a pattern of cavities having the dimensions and profile of those shown in FIGS. 1, 2 and 3. The cavities of FIG. 5 are arranged in a square pattern with each cavity being closely spaced from flow adjacent cavities on the same surface. This pattern does not provide as high a degree of overlap as given by the pattern of FIG. 3. The latter has each cavity closely spaced to six cavities on the same surface, ie a hexagonal pattern.

Figure 6:
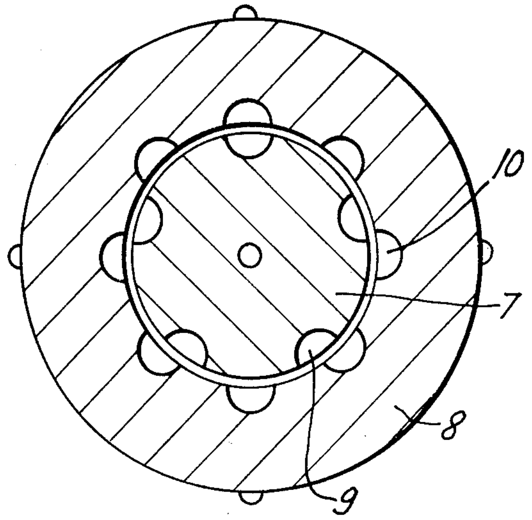
FIG. 6 is a transverse section through a mixer having grooves in the opposed surfaces of the device.

FIG. 6 is a section of a cavity transfer mixer having a rotor 7 rotatably positioned within the hollow stator 8 having an effective length of 10.7 cm and a diameter of 2.54 cm. The rotor carried five parallel grooves 9 of semi-circular cross section (diameter 5 mm) equally spaced around the periphery and extending parallel to the longitudinal axis along the length of the rotor. The inner cylindrical surface of the stator 8 carried eight grooves 10 of similar dimensions extending along its length and parallel to the longitudinal axis. This embodiment, utilised cavities extending along the length of the stator and rotor without interruption. Temperature control jacket and conduit were present.

Figure 7:
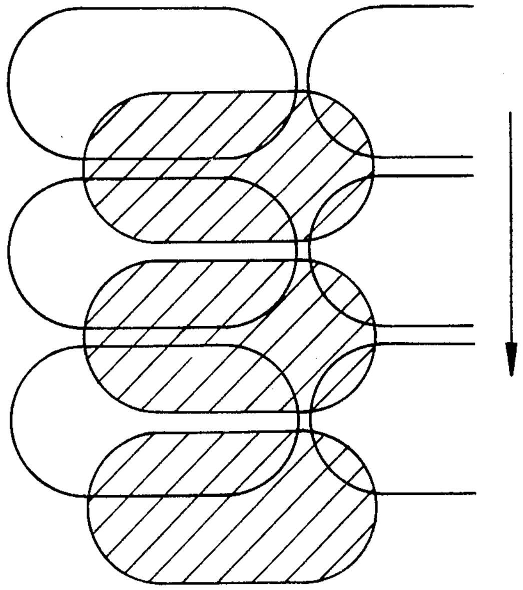

FIG. 7 shows a pattern of cavities wherein the cavities on the rotor, shown hatched, and stator have a larger dimension normal to the material flow; the latter is indicated by an arrow. The cavities are thus elongate. This embodiment provides a lower pressure drop over its length compared with devices of similar geometry but not having cavities positioned with a longer dimension normal, i.e. perpendicular to the material flow. To obtain a reduction in pressure drop at least one of the surfaces must carry elongate cavities having their longer dimension normal to the material flow.

Figure 8:
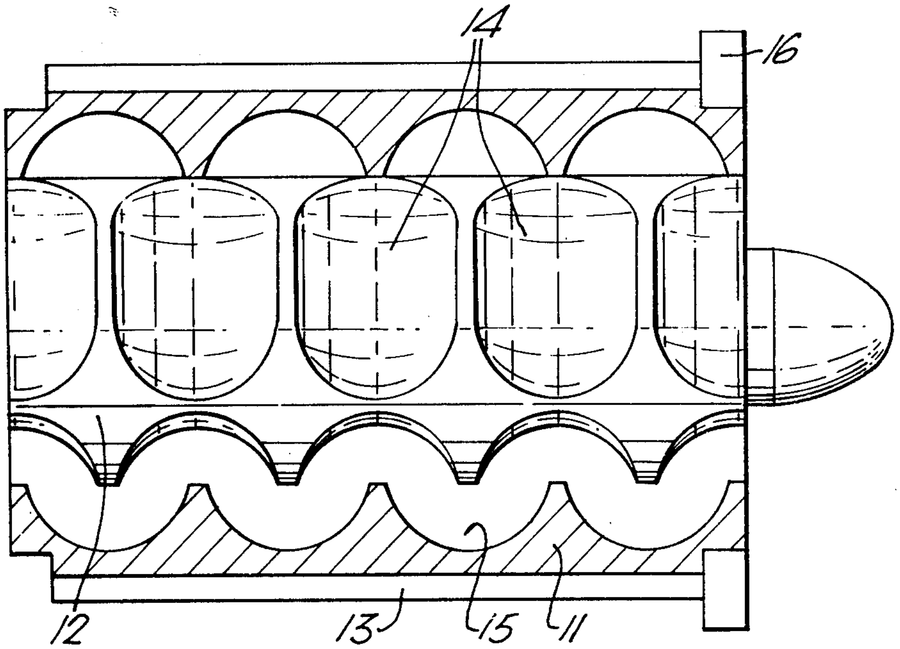
FIG. 8 is a longitudinal section of a cavity transfer mixer in which the external cylinder forms the rotor.

The cavity transfer mixer of FIG. 8 had the external cylinder 11 journalled for rotation about central shaft 12. Temperature control jacket 13 and conduit were present but the latter is now shown because the cavities on the central shaft are shown in plan view while the rotor is sectioned. The central stator (diameter 52 mm) had three rows 14 of three cavities with partial, i.e. half cavities at the entry and exit points. On the rotor there were four rows 15 of three cavities. The cavities on the stator and rotor were elongate with a total arc dimension of 5.1 cm normal to the material flow with hemispherical section ends of 1.2 cm radius joined by a semicircular sectioned panel of the same radius. The cavities were arranged in the pattern of FIG. 7, i.e. with their long dimension normal to material flow. The rotor was driven by a chain drive to external toothed wheel 16.

EXAMPLES

An Example of a process of the invention will now be given:

The cavity transfer mixer illustrated in FIG. 1 was used.

The mixer had a rotor radius of 2.54 cm with 36 hemispherical cavities (radius 0.9 cm) arranged in six rows of six cavities. The internal surface of the stator carried seven rows of six cavities to provide cavity overlap at the entry and exit.

A soap feedstock of 60% tallow 40% coconut with 7½% of the feedstock being present as free fatty acid was used. The soap was vacuum dried to 10% moisture and 0.6% electrolyte. The dried chips were extruded through the device with the aid of a soap plodder; the inlet temperature of the soap was 35° C. and after passage through the device it was 37° C. The rotor was operated at 50 rpm and the throughput was 267 g $min^{-1}$. Water cooling was applied to the stator and rotor. The extruded billet was cut and stamped into tablets.

The mush was measured by immersing a tablet in distilled water at ambient temperature for 2 hours and measuring the mush as the amount removed per 50 sq cms surface. Lather was measured as the volume produced during hand washing.

The product tablets had reduced mush and increased lather compared to a commercial product prepared from the same feedstock.

What we claim is:

1. The process improving the mush and/or lather properties of superfatted soap-containing detergent material in which the superfatted soap-containing material is subjected to working by passing the material between two closely spaced mutually displaceable surfaces each having a pattern of cavities which overlap during movement of the surfaces so that the material moved between the surfaces traces a path through cavities alternately in each surface, whereby the bulk of the material passes through the shear zone in the material generated by displacement of the surfaces.

2. A process according to claim 1 wherein the two surfaces have cylindrical geometry.

3. A process according to claim 1 or 2 wherein thermal control is applied to at least one surface.

4. A process according to claim 1 or 2 wherein the cavities in at least one surface are elongate with their long dimension normal to the flow of material.

5. A process according to claim 1 or 2 wherein the temperature of the soap-containing formulation during processing is below about 42° C., preferably below about 40° C.

* * * * *